(12) United States Patent
Muppirala et al.

(10) Patent No.: US 7,673,082 B2
(45) Date of Patent: Mar. 2, 2010

(54) METHOD AND SYSTEM TO DETERMINE DEVICE CRITICALITY FOR HOT-PLUGGING IN COMPUTER CONFIGURATIONS

(75) Inventors: Kishore Kumar Muppirala, Bangalore (IN); Vasundhara Gurunath, Bangalore (IN); Ushadevi Hassan Nagaraja, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 23 days.

(21) Appl. No.: 12/129,533

(22) Filed: May 29, 2008

(65) Prior Publication Data

US 2008/0313378 A1      Dec. 18, 2008

(30) Foreign Application Priority Data

May 29, 2007    (IN)    .................. 1116/CHE/2007

(51) Int. Cl.
*G06F 13/00*    (2006.01)
*H05K 7/10*    (2006.01)

(52) U.S. Cl. ................. 710/104; 710/15; 710/62; 710/300; 710/301; 710/302

(58) Field of Classification Search ................. 710/301, 710/302
See application file for complete search history.

(56) References Cited

U.S. PATENT DOCUMENTS

| 6,408,343 | B1 * | 6/2002 | Erickson et al. | 710/15 |
| 6,779,064 | B2 * | 8/2004 | McGowen et al. | 710/104 |
| 7,191,275 | B2 * | 3/2007 | Arackal et al. | 710/302 |
| 7,305,497 | B2 * | 12/2007 | Houdek et al. | 710/15 |
| 2006/0069835 | A1 * | 3/2006 | Arackal et al. | 710/302 |
| 2007/0011499 | A1 * | 1/2007 | Bergsten et al. | 714/100 |
| 2008/0183659 | A1 * | 7/2008 | Kuttan et al. | 707/2 |

* cited by examiner

*Primary Examiner*—Mark Rinehart
*Assistant Examiner*—Brian T Misiura (57) ABSTRACT

The invention relates to a method for determining device criticality in a computer system comprising the steps of building a component hierarchy graph using computer configuration information; labeling the nodes of component hierarchy graph with redundancy attribute; traversing the component hierarchy graph; and determining whether the device loses an access path by inspecting the redundancy attributes within the component hierarchy graph. Furthermore, one of a plurality of severity levels is assigned to each identified affected resource based on predetermined criteria. The severity levels include a low severity level, a medium severity level, and a high severity level. Each severity level represents degree of impact to the computer system if functionality of the identified affected resource became unavailable.

17 Claims, 6 Drawing Sheets

Directed Acyclic Graph (DAG)

METHOD AND SYSTEM TO DETERMINE DEVICE CRITICALITY FOR HOT-PLUGGING IN COMPUTER CONFIGURATIONS

RELATED APPLICATIONS

This patent application claims priority to Indian patent application serial no. 1116/CHE/2007, having title "Method and System to Determine Device Criticality for Hot-plugging in Computer Configurations", filed on 29 May 2007 in India (IN), commonly assigned herewith, and hereby incorporated by reference.

BACKGROUND OF THE INVENTION

Computer servers are utilized in a variety of applications. Systems, such as server systems executing purchase transactions for an Internet-based merchant, usually have a high-availability design. Such high availability systems are designed to be running and available at all times. Thus, the need for powering down and rebooting these systems for any reason for example maintenance, upgrades, system crashes, troubleshooting, etc., has to be avoided as much as possible. Typically, these systems have a plurality of expansion slots, wherein a card is coupled to the slot. Mass storage devices and network adapters are examples of components that may be connected via such cards. Generally, one or more further devices may be coupled to the card via cables.

To maintain high-availability, online card operation capability has been integrated into high availability computer systems. The online hot plug operation capability enables a user and/or a system administrator to perform online hot plug operations without powering down and rebooting these systems. Examples of online card operations include adding a card to the system by coupling it to a slot, replacing an existing card that is coupled to a slot with another card, and removing a card from the system by uncoupling it from a slot while the system is running. These online hot plug operations generally require that particular drivers for the card be suspended and that the power to the slot(s) of interest be shut-off before a card can be added, replaced, or removed. Generally, slot power control and drivers may facilitate these online card operations. In some systems, several slot power domains are configured, wherein slots in each slot power domain share a common power line. If an online card operation is performed on any slot in a slot power domain, then all the slots in the slot power domain may lose power, increasing the complexity of performing the online card operation.

Before such an online hot plug operation, typically a resource analysis is performed on the computer systems. The resource analysis may also be useful when groups of cards are taken offline in a single operation such as when an entire chassis of cards is removed from the computer system while the system is running. The resource analysis may also be referred to as a "critical resource analysis" (CRA). The CRA may analyze and report the impact of powering down each slot associated with any card that is involved in any attempted online hot plug operation example, adding, replacing, or removing card(s). This may require identifying affected resources of the system. Conventionally, the identified affected resources are assigned a low severity level or warning level and a high severity level or critical level. If the identified affected resources are essential for system operation, they are assigned the critical level. This indicates that if the slot(s) is powered down causing the unavailability of the functionality of the card(s) coupled to it, the system likely will crash or enter an unhealthy/failed state. The user is generally prevented from performing the online card operation if an identified affected resource is assigned the critical level so that the system keeps running to maintain the desired system availability level. The manner of determination of whether an identified affected resource is "essential for system operation" may vary among different systems. If the identified affected resources are not essential for system operation, they are assigned the warning level. This indicates that if the slot(s) is powered down causing the unavailability of the functionality of the card(s) coupled to it, the system likely will not crash or enter an unhealthy/failed state.

In general, CRA performs a series of checks to conclude if the card and/or slot and the resources/devices associated with it are essential to system operation. The CRA functionality is intended to keep the system running and avoid inadvertent reboots as well as prevent the system from getting into an unhealthy state.

BRIEF DESCRIPTION OF DRAWINGS

Embodiments of the invention will now be described by way of example only, with reference to accompanying drawings, wherein.

DETAILED DESCRIPTION OF EMBODIMENTS OF INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

There will be described a method, a system and a computer program for determining device criticality with respect to a hot-plugging operation in a computer configuration by representing a component hierarchy, including potentially multiple paths to affected devices, with a directed acyclic graph (DAG).

In the following part of the description terms "resource analysis" and "device criticality analysis" will be used interchangeably.

Figure 1:
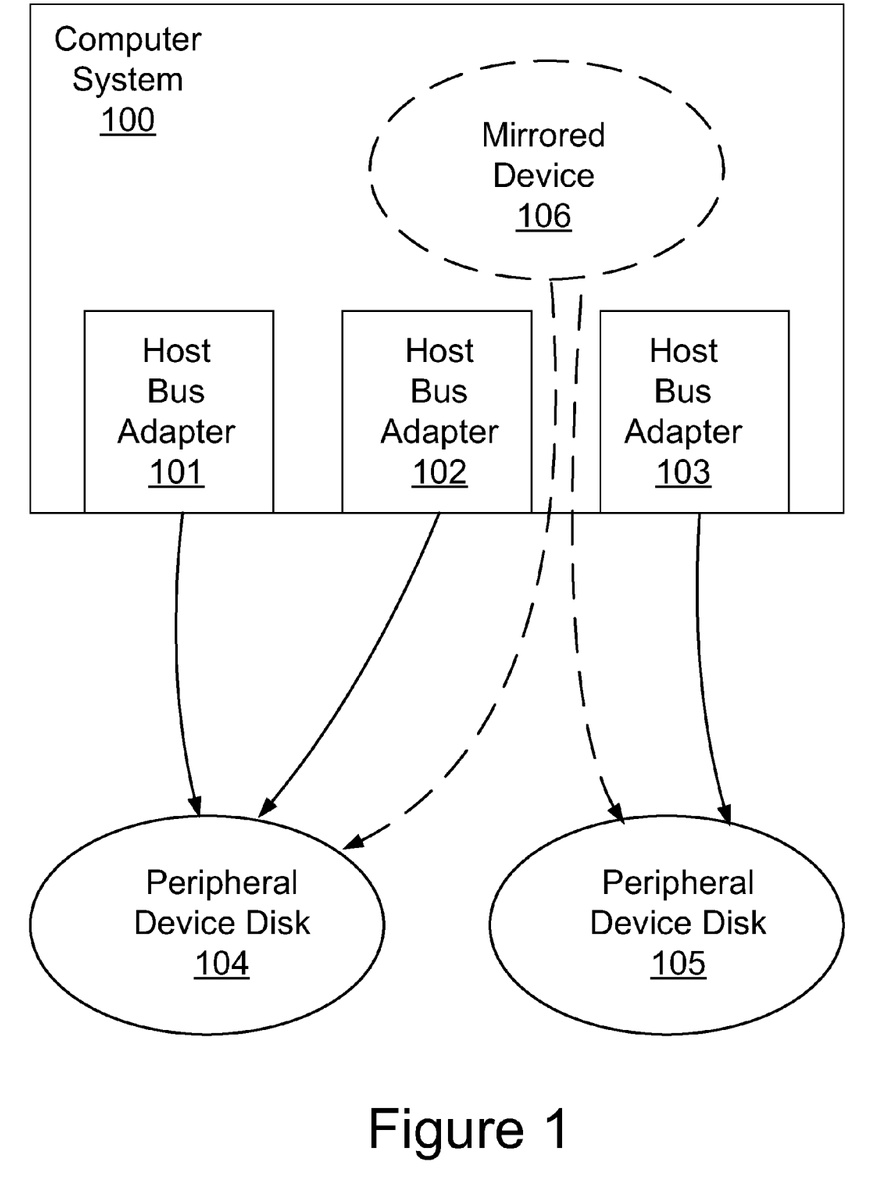
FIG. 1 illustrates hardware and software components in a high availability computer system configuration.

FIG. 1 illustrates an example of a simple high availability computer configuration. The highly available computer configuration may consist of a computer system 100 that may comprise three host bus adapters HBA1 101, HBA2 102 and HBA3 103 to connect it to peripheral device disks dsk1 104 and dsk2 105. The peripheral device disks may be a memory disk device or a group of memory disk devices being accessed by the host bus adapters. The said computer system also may comprise software for managing disk mirroring for example volume manager, mirrored device 106. Such computer system may consist of any number of host bus adapters depending on the requirements of the computing environment. Similarly, the peripheral devices dsk1 104 and dsk2 105 may comprise a single device disk and/or a group of device disks. The peripheral devices dsk1 104 and dsk2 105 in a computer may be connected to a motherboard via a Peripheral Component Interconnect (PCI) bus, for instance.

As an example if the Host Bus Adapter (HBA1) 101 in FIG. 1 is getting hot-plugged (either a replace or delete operation), the conventional CRA computation would have flagged the operation critical if the disk device were under use by either a process in the system or used by the system's Operating System (OS) to store important data. However, since the disk device 104 continues to be accessible through HBA2 102 because of redundant access paths, the operation may be permitted. Further, if the hot-plug operation were requested for host bus adapter HBA1 101 and HBA2 102, the CRA computation should detect that the disk device 104 and 105 would be impacted. However, since the disk devices 104 and 105 are mirrored by software, volume manager in this case, CRA should detect this and report that there is likely performance degradation and loss of mirroring as a "warning" to the user and permit the hot plug operation as loss of disk device may not result in failure of the computer system.

A directed acyclic graph, which will in the following sometimes be abbreviated to DAG, is a directed graph with no directed cycles. In a DAG, for any given vertex v, there is no non empty directed path starting and ending on v. Directed acyclic graphs appear in models where it may not make sense for a vertex to have a path to itself, for example if an edge u→v indicates that vertex v is a part of vertex u, such path would indicate that vertex u is a part of itself, which may be improbable.

Figure 6:
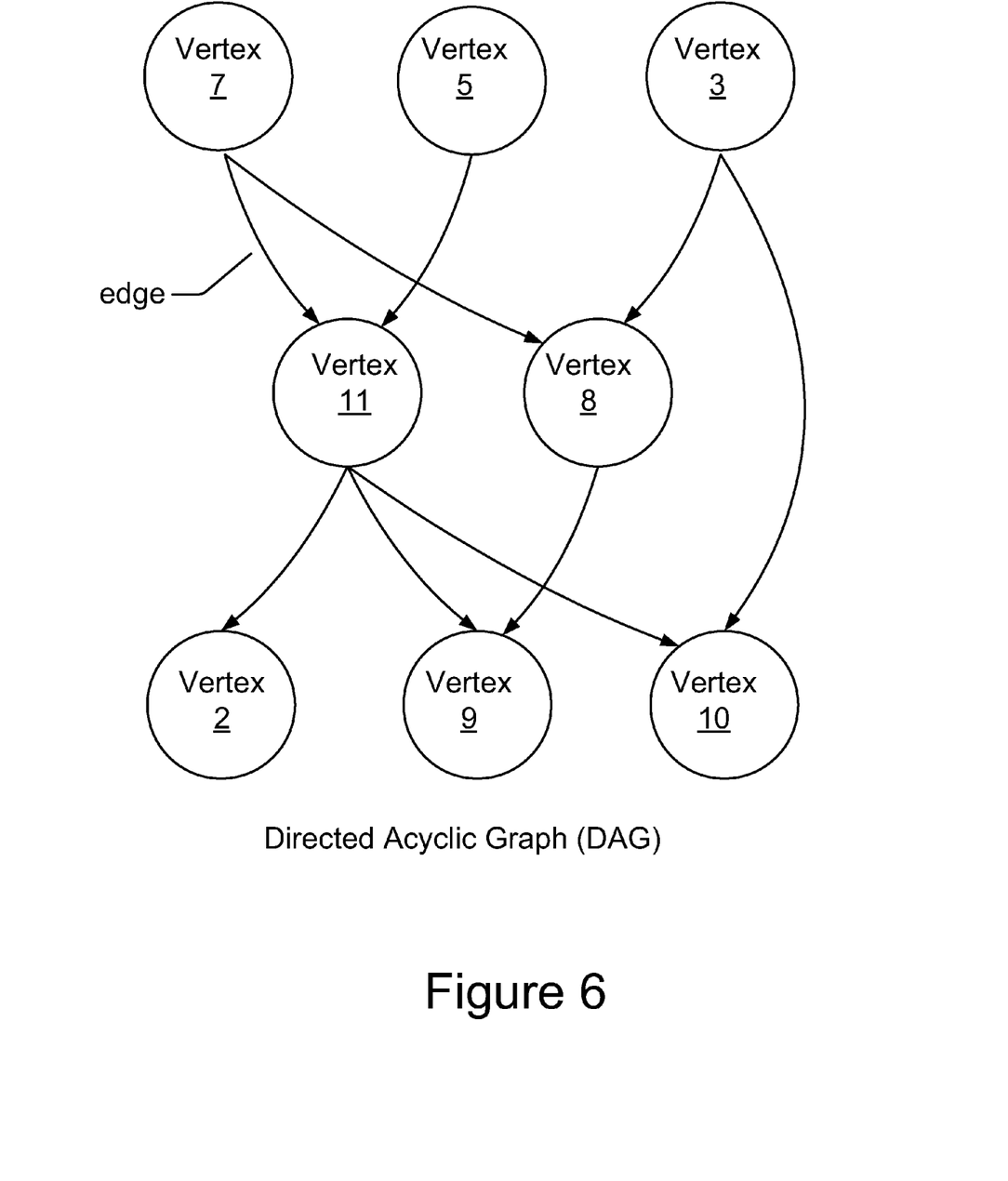
FIG. 6 illustrates an example of a directed acyclic graph.

The directed acyclic graph may correspond to a partial order on its vertices. For two given vertices u and v of a DAG; u≦v is in the partial order exactly when there is a directed path from vertex u to vertex v in the graph. However many different directed acyclic graphs may represent the same partial order in this way. In a DAG a source is a vertex with no incoming edges. Similarly a sink is a vertex with no outgoing edges. A finite DAG has at least one source and at least one sink. The length of a DAG is the length (number of edges) of a longest directed path. A typical structure of a directed acyclic graph is illustrated in FIG. 6.

In a computer configuration such as that illustrated in FIG. 1, a device such as device disk 104 may be accessed by host bus adapters through more than one defined path. For example in FIG. 1 device disk 104 may be accessed by two different host bus adapters HBA1 101 and HBA2 102 through two paths. Here in this description such devices with multiple access paths are labeled as redundant with the number of paths as the degree of redundancy. These device paths i.e. the paths through which devices are connected to the host bus adapters, may be represented in form of edges of the component hierarchy graph. A component hierarchy of a more complex computer system, in form of component hierarchy graph is illustrated in FIG. 2 as an example.

Figure 2:
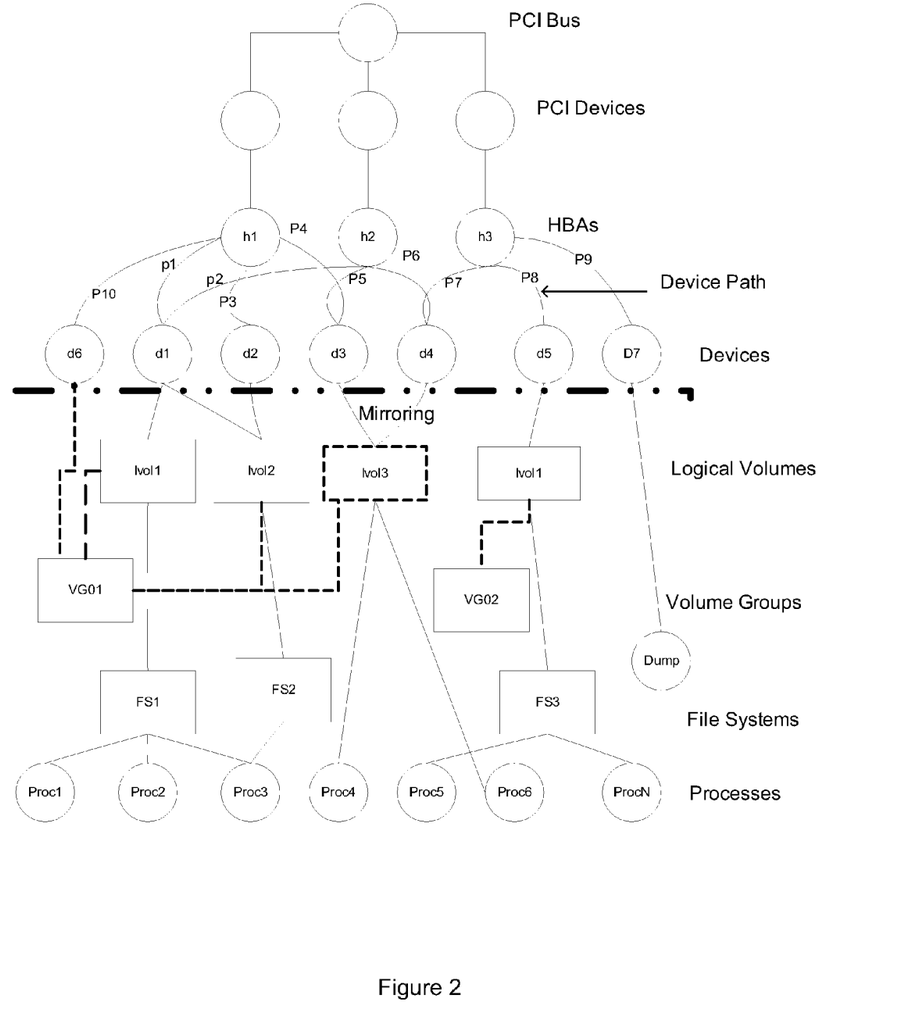
FIG. 2 illustrates an example of component hierarchy graph which may include hardware and software components.

The computer configuration illustrated in FIG. 2 by way of component hierarchy graph comprises of three host bus adapters (h1, h2 and h3) and seven disk devices (d1, d2, d3, d4, d5, d6 and d7) connected to the host bus adapters. The disk devices are connected to the host bus adapters via ten device paths P1, P2, P3, P4, P5, P6, P7, P8, P9 and P10. For example the disk device d1 is connected to host bus adapters through two paths P1 and P2. Similarly disk device d3 is connected through paths P4 and P5. Hence the nodes corresponding to disk devices d1 and d3 in the component hierarchy graph are redundant nodes. Hence in component hierarchy graph the nodes corresponding to device disks d1 and d3 will carry an attached redundancy attribute with degree of redundancy as two. The devices may be accessed by the host bus adapters through any of the device paths through which they are connected. The attributes with the nodes are described in greater detail in following part of this description.

The component hierarchy graph of a computer system may be extended beyond the hardware layer of the computer configurations and may also include logical constructs used by the software layers in the system. The software layers of a computer configuration may use logical constructs such as software volume managers, logical disk device, volume groups, file systems and processes. Inclusion of these logical constructs in the component hierarchy graph may increase the efficiency of the resource analysis algorithm. The nodes of the component hierarchy graph that correspond to these logical constructs will be referred to herein as software nodes.

The component hierarchy of a computer system may be built at the boot time and stored by the operating system. Since in a computer system the configuration may not change very frequently, the component hierarchy graph also will not change very frequently. In the case of changes in the configuration of the computer configuration, the component hierarchy graph may be modified to reflect the changes. The complete component hierarchy of the computer system may be made accessible either from user space or kernel space. Since the association of devices in a computer configuration with volume manager, and file system does not change frequently, the binding of the nodes of the component hierarchy happens whenever a new volume group or file system mount point is created or modified. During the boot process, the system firmware may examine the PCI configuration space of each device and allocate the system resources.

The component hierarchy graph may include at each node certain attributes associated with each of the components of the computer system, such as the number of access paths to a device, whether or not the device is a boot device or quorum disk, for instance, or other information that may be useful in determining device criticality as described below.

The nodes in the component hierarchy graph which have redundant links would carry a "REDUNDANCY" attribute along with the number of currently active redundant links. Initially each of the nodes in the component hierarchy is marked "NON-REDUNDANT", indicative of non-redundancy at the time of building the component hierarchy graph. With reference to FIG. 2, the node labeled "d5" is a "NON-REDUNDANT" node whereas, "d3" is a "REDUNDANT" node with redundancy of "2" (owing to logical unit number (LUN) paths "p4" and "p5"). Further, the node lvol3 (in the context of VG01) is a "REDUNDANT" node, owing to the mirroring of data between the disks "d3" and "d4". Further, each node in the component hierarchy with "REDUNDANCY" attribute may get a count of children that are currently active below it.

In the component hierarchy graph, different software nodes may also have a redundancy attribute associated with them. The use of such a redundancy attribute is expected to be particularly useful for "Logical Volumes" since this is the most likely logical construct which can create software redundancy, due to mirroring, in modern server systems. However, application of the technique to other similar or comparable logical constructs is not excluded. Redundancy at application level, for example, may exist where a "process" may be able to deal with device/disk failure. In such cases, the method for determining device criticality, may conclude that the loss of one of the devices that the application/process is using is acceptable. In this case, the process that is using two devices would be represented by a "REDUNDANT" node in the component hierarchy graph.

Along with the redundancy attributes, the proposed technique may also associate a criticality attribute with all software nodes in the component hierarchy graph. The criticality attribute at the nodes of the component hierarchy graph may improve the functioning of the algorithm and may make algorithm extensible for handling application level criticality analysis. The criticality attribute may also help in determining the criticality across computer systems for example, in a cluster configuration. As an example, if a boot device is critical, a boot process software node would be created in the component hierarchy graph with the boot device as its predecessor node. Similarly, for the case of dump configured to write directly to dump devices, a software node labeled "dump" would be created with the device(s) it uses to dump as its predecessors. If the dump is configured over a logical volume, the "lvol" node, already in the component hierarchy, will be the dump node's predecessor. The boot process node in the hierarchy may carry "critical for the system functioning" as its "criticality" attribute. Similarly, the "dump" software node may carry a suitable value of the "criticality" attribute.

Figure 3:
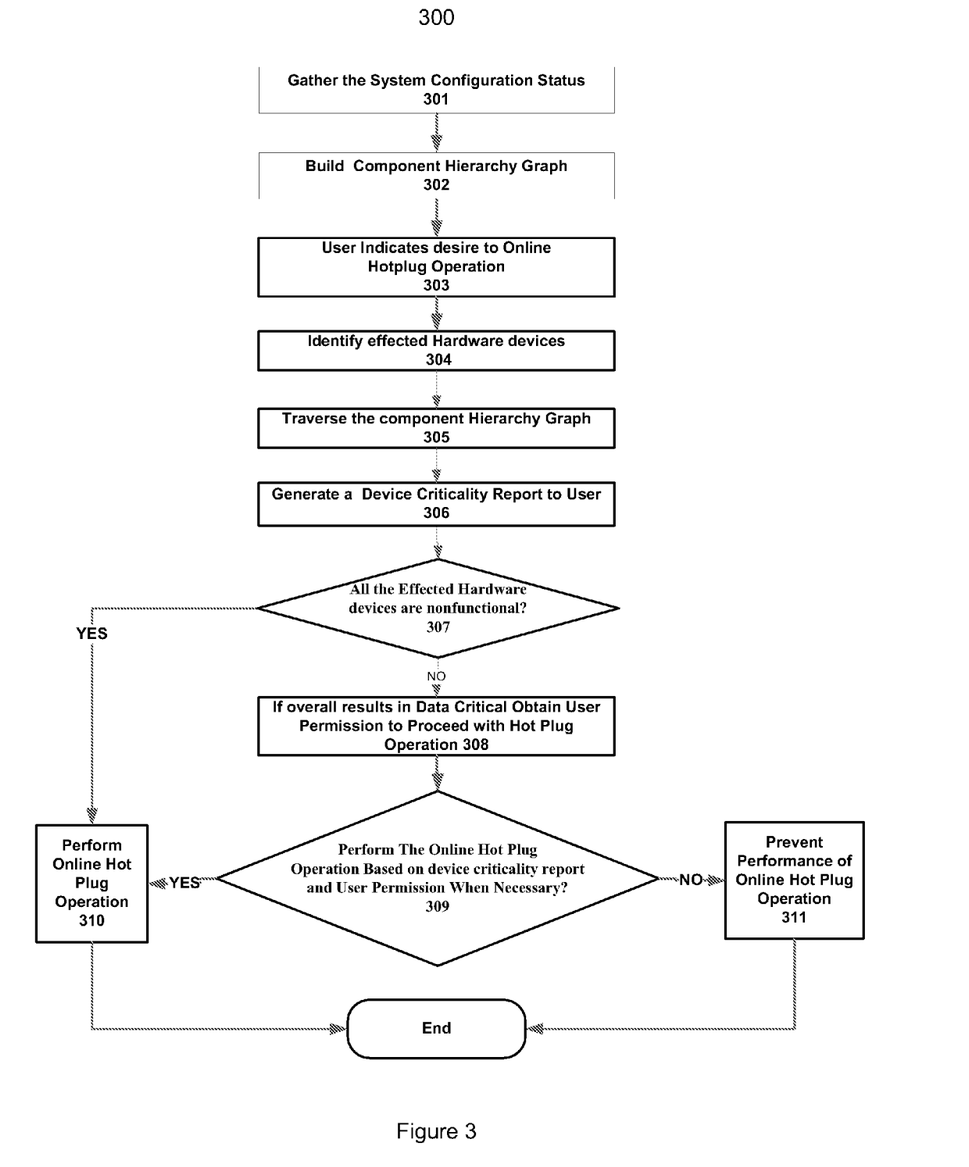
FIG. 3 is a flow chart showing a method of performing device criticality analysis on one or more devices of a system.

FIG. 3 is a flow chart illustrating a method 300 of performing device criticality analysis for a hot plugging operation on one or more devices of a computer system. In an embodiment, the present technique may be implemented as computer-executable instructions for performing the method 300. The computer-executable instructions can be stored in any type of computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

At step 301 of FIG. 3, the technique gathers the system configuration information. Generally, the system configuration information includes different types of configuration information. In an embodiment, the system configuration information includes logical volume configuration, file system configuration, process configuration, swap device configuration, and dump device configuration. The system configuration gathered in step 301 may be used in step 302 to build the component hierarchy graph for the given computer system. The component hierarchy graph of the computer system may also be built and stored when the system is booted.

At Step 303 of FIG. 3, the user indicates a desire to perform an online hot plug operation for example, adding, replacing, or removing a card(s). Here, it is assumed that the user knows which device(s) will be involved in the attempted online hot plug operation. The online hot plug operation requires suspending drivers to the hardware devices associated with the device(s) of interest and powering down the corresponding slot to which the device is coupled. However, if the corresponding slot is in a slot power domain for example, several slots sharing a power line, the other slots in the slot power domain will also be powered down. Hence, the devices coupled to these slots also will be involved in the attempted online hot plug operation since these slots are also being powered down.

The user may use a suitable user interface of the computer system 100 to indicate the desire to perform the online hot plug operation. Alternatively, the user may press the attention button of the slot to trigger a hot plug event. This activates the online hot plug operation unit to prepare the system 100 for performing the online hot plug operation. In preparing the system 100 for performing the online hot plug operation, the resource analysis algorithm is invoked, providing accessibility to the device criticality functionality.

For explanation purposes, it will be assumed that several devices of the system 100 are involved in or affected by the attempted online hot plug operation.

At Step 305, the component hierarchy graph is traversed starting from each affected hardware device 304, wherein each affected hardware devices correspond to any of the devices involved in or affected by the attempted online hot plug operation. It will be understood that multiple affected hardware devices may correspond to the same card. The traversing of component hierarchy graph uses the approach of determining if any configured resource (identifiable from the system configuration information) is affected based on the affected nodes of the component hierarchy graph. The algorithm for traversal of component hierarchy graph 400 is illustrated in detail in FIG. 4.

Figure 5:
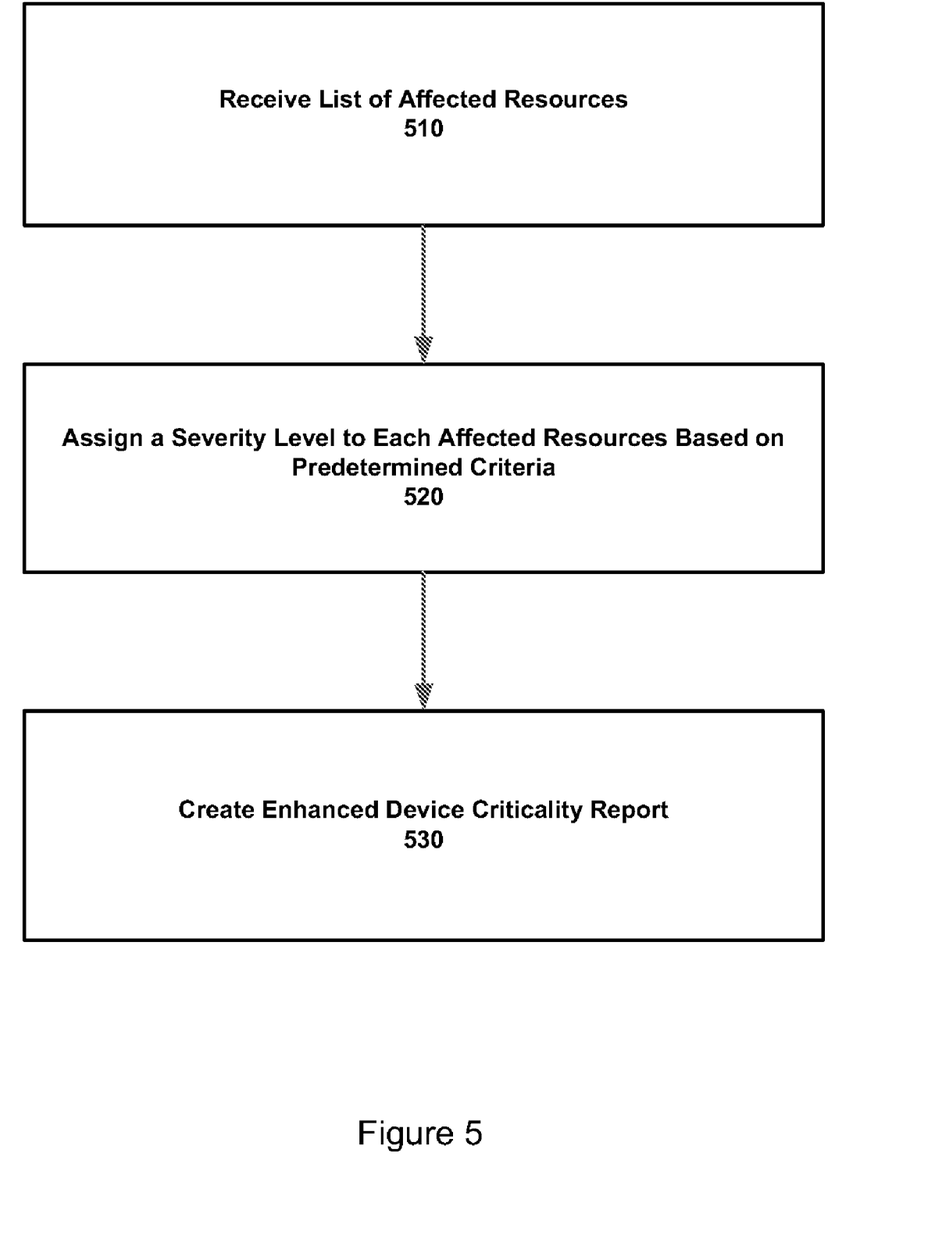
FIG. 5 is a flow chart showing generation of the device criticality report of FIG. 3.

At Step 306, the algorithm may generate a device criticality report based on the information from Step 305. FIG. 5 describes Step 306 in greater detail. The device criticality information includes one or more lists of affected resources identified in Step 305. Generally, the reason for identifying a resource as an affected resource is included in the analysis information. The affected resource may be assigned a severity level based on predetermined criteria. The severity levels include a low severity level, a medium severity level, and a high severity level, as described above. The device criticality report may present the analysis results in any suitable manner to provide sufficient information to the user to allow the user to decide whether to permit performance of the online card operation if permission from the user is necessary.

Continuing at Step 307, the algorithm may determine whether the identified affected hardware devices are nonfunctional. If the affected hardware devices are nonfunctional, there is no need to get user permission for hot plugging since these affected hardware devices cannot be essential to system operation because these affected hardware devices are not providing their functionality to the system 100 and yet the system 100 continues to operate normally. Thus, the method 300 proceeds to Step 310, where the user is allowed to proceed with the online hot plug operation. If any of the affected hardware devices are functional, the algorithm proceeds to Step 308.

Figure 4:
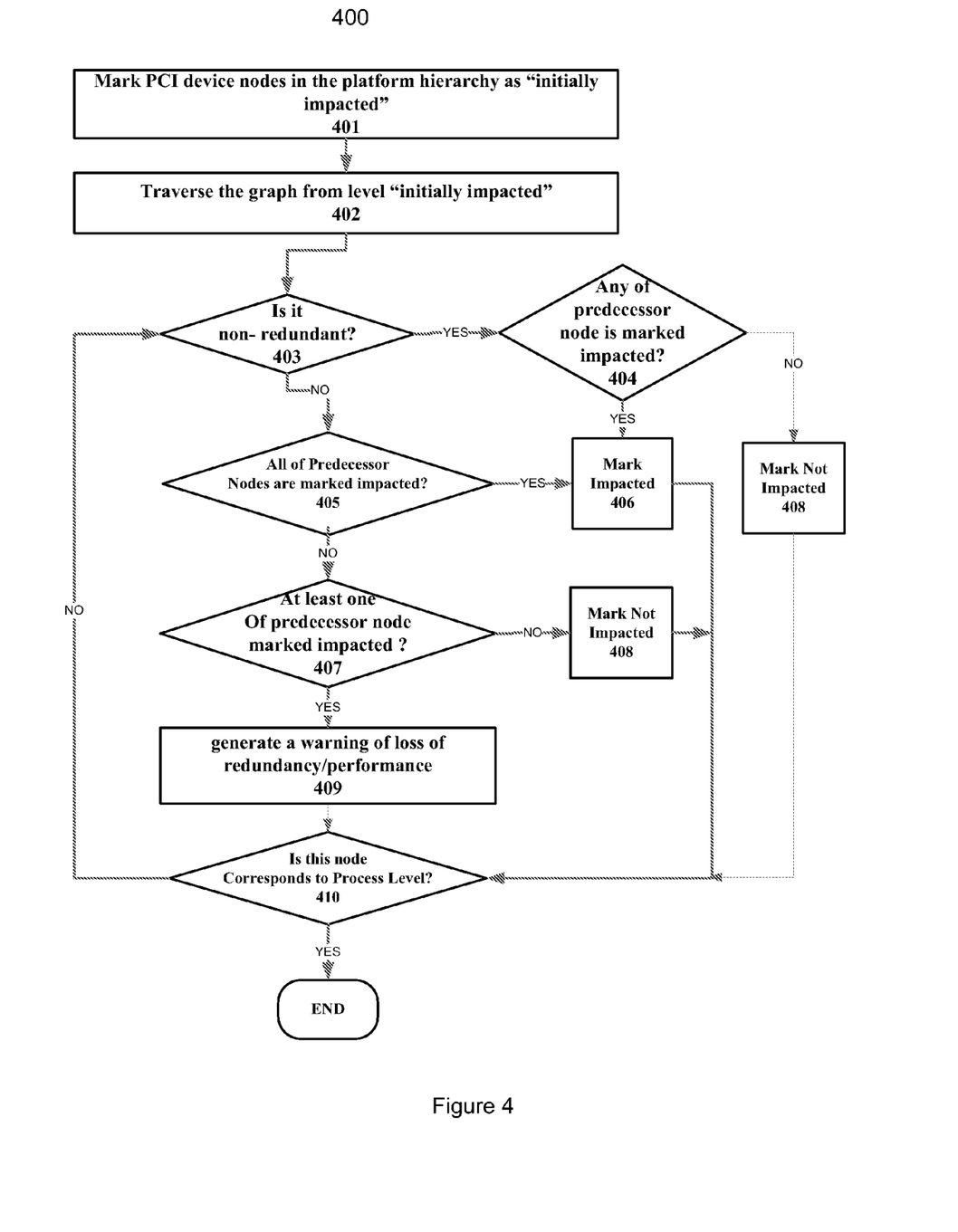
FIG. 4 is a flow chart showing algorithm for traversal of component hierarchy graph.

FIG. 4 illustrates a flow chart 304 showing traversing of the component hierarchy graph of FIG. 2 in accordance with an embodiment of the present technique. In particular, FIG. 4 describes the Step 304 of FIG. 3 in greater detail.

At Step 401, PCI device nodes of the component hierarchy graph are marked as "initially impacted". After marking the PCI devices nodes of the component hierarchy graph as "initially impacted" the algorithm traverses the graph starting from the initially impacted level 402.

Continuing to step 403 the algorithm determines if the node under consideration has a "redundancy" attribute associated with it. In case of the node under consideration is marked "non-redundant" the algorithm proceeds to step 404 to determine if any of the predecessor nodes of the node under consideration is marked "impacted". If none of the predecessor nodes of the node under consideration is marked "impacted" then the node under consideration is marked as "not impacted". If any of the predecessor nodes of the node under consideration is marked "impacted" then the node under investigation is marked as "impacted" 406.

Further continuing to step 405, if the node under investigation is mark as "redundant" and each of the predecessor nodes of the node under investigation are marked as "impacted" then the node under investigation is also marked as "impacted" 406.

At step 407 of FIG. 4, if at least one of the predecessor nodes of the node under investigation is marked as "impacted". In case of none of the predecessor nodes being marked as "impacted" then the node under investigation is marked as "not impacted" at step 408, else algorithm proceeds to step 409 of FIG. 4.

Continuing to step 409, if at least one of the predecessor node of the node under investigation is marked as "impacted" then the algorithm generate a warning of loss of redundancy for the node under investigation. The algorithm can also generate a warning of loss of performance at step 409 of FIG. 4.

Further continuing to step 410 of FIG. 4, the algorithm checks the node under investigation represents a node corresponding to process level node in the component hierarchy graph. If the node is not a process level node then the algorithm goes to step 403 analyzing the next level in component hierarchy graph. The cycle is repeated till the algorithm reaches the nodes corresponding to the process level node which is lowest level in the component hierarchy graph, ensuring the complete traversal of the component hierarchy graph.

The pseudo code of the algorithm for traversing of the component hierarchy graph of FIG. 4 to compute the impact of a tot-plug operation in a computer system is given below:

```
Mark all PCI device nodes in the platform hierarchy that are part of Hot-
Plug
    operation as "initially impacted";
for each level in the tree from the "initially impacted"
    level to the Process level do
    if the type of node is "NON-REDUNDANT" then
        if ANY of my predecessor nodes (i.e., nodes connected to me
            from my previous level) is "impacted" then
            mark me "impacted";
    else /* it is a "REDUNDANCY" node */
        if all of my predecessor nodes are marked "impacted" then
            mark me "impacted";
        endif
        if at least one of my predecessor nodes is marked "impacted"
        then
            generate a warning of loss of redundancy/performance
            (but this node will not be marked as "impacted");
        endif
    endif
endfor
```

Additionally, the criticality report may provide an overall result of the analysis. In an embodiment, the overall result may be success, warning, data critical, system critical or error.

If the overall result is success, this indicates that the technique found no affected resources, wherein the user is provided a success message and allowed to proceed to the online hot plug operation.

Furthermore, if the overall result is warning, this indicates that the technique found one or more affected resources. However, these affected resources were assigned the low severity level (or warning level) but none were assigned the medium severity level (or data critical level) or the high severity level (or system critical level). The user is provided a warning message stating that the affected resources are not deemed critical to system operation and allowed to proceed to the online card operation.

Continuing, if the overall result is data critical, this indicates that the technique found one or more affected resources. However, at least one of these affected resources was assigned the medium severity level (or data critical level) but none were assigned the high severity level and/or system critical level. The user is provided a data critical message stating that probably or possibly data stored in the system 100 will be lost but probably the system 100 will not crash or enter an unhealthy/failed state. However, permission from the user may be obtained before proceeding to the online hot plug operation.

If the overall result is system critical, this indicates that the technique found one or more affected resources. However, at least one of these affected resources was assigned the high severity level and/or system critical level. The user is provided a system critical message stating that the system 100 is likely to be brought down. Hence, the user might as well shut down the system 100 and reboot to ensure the system 100 does not enter an unhealthy/failed state. In this case, the user can be prevented from proceeding with the online card operation.

Starting with Step 307 of FIG. 3, the online hot plug operation unit proceeds based on the results from the traversal of component hierarchy graph.

Furthermore, at Step 308, if the overall result is data critical, the online hot plug operation unit obtains permission from the user to proceed with the online card operation.

Continuing, at Step 309, the online card operation unit determines whether to perform the online card operation (e.g., adding, replacing, or removing card(s)) based on the analysis from the device criticality report and the user input. Moreover, if the overall result in the device criticality report is data critical, the online hot plug operation unit determines whether the user has provided permission to proceed with the online card operation.

If the overall result is success or loss of redundancy, the online hot plug operation unit facilitates the performance of the online hot plug operation. Additionally, if the overall result is loss of device the user has provided permission to proceed with the online card operation, the online card operation unit facilitates the performance of the online card operation. Moreover, if all the affected hardware devices are non-functional (as determined at Step 307), the online card operation unit facilitates the performance of the online card operation, at Step 310.

However, if the overall result is system critical or error, the online card operation unit does not proceed with performance of the online card operation, at Step 311. Moreover, if the overall result is data critical and the user has not provided permission to proceed with the online card operation (at Step 308), the online card operation unit does not proceed with performance of the online card operation, at Step 311.

FIG. 5 illustrates a flow chart showing generation of the enhanced device criticality report of FIG. 3 in accordance with an embodiment of the present invention. In particular, FIG. 5 describes the Step 306 of FIG. 3 in greater detail.

At Step 510, the created lists of affected resources are received. The lists include the list created by traversing the component hierarchy graph at Step 306 (of FIG. 3 and described in greater detail in FIG. 4).

Continuing, at Step 520, a severity level is assigned to each identified affected resource based on predetermined criteria, wherein the severity level represents degree of impact to the system 100 if functionality of the identified affected resource became unavailable. In an embodiment, the severity level is a warning level, a data critical level, or a system critical level. Selection of the predetermined criteria can affect the accuracy of the analysis results.

There will now be described a set of criteria for assigning the severity levels in an embodiment of the present invention. It will be understood that the assignment of severity levels may be different for different types of systems.

According to an embodiment, affected logical volumes that are not being used, affected volume groups having affected disks but no affected logical volumes, and affected logical volumes having at least one alternate unaffected hardware identifier, which is operating and available, are assigned the warning level.

Generally, affected file systems that are locally mounted (e.g., mounted on affected logical volumes which do not have at least one alternate unaffected hardware device that is operating and available, or mounted on an affected disk) are assigned the data critical level. However, affected file systems that are found on affected logical volumes having at least one alternate unaffected hardware device, which is operating and available, are assigned the warning level. Additionally, the system critical level is assigned to the following affected file systems: /, /stand, /usr, /etc, and FS swap. If / was lost, then there will not be the ability to get into /usr/sbin to power the card back on. If /stand was lost, the kernel registry service will be unable to continue. If /usr was lost, then there will not be the ability to power the card back on. If /etc was lost, the online card operation unit will fail because it cannot write to syslog. If FS swap was lost, the kernel can be swapped out and will panic if it cannot swap itself back in.

The affected processes may be assigned the data critical level. Furthermore, the affected swap devices may also be assigned the system critical level. Loss of a swap device could be catastrophic if the operating system tries to swap information on a defined location no longer available.

The affected dump devices may be assigned the warning level. A dump device is not critical to system operation but may be important to a user for troubleshooting.

The disclosed technique may be used to extend the concept of "criticality" to application level by creating a list of process names, whose functioning is critical to the system. All the process instances of these processes may be tagged as "critical" in the component hierarchy.

Referring again to FIG. 5, at Step 530 the device criticality report is generated. The device criticality report may include each identified resource and corresponding severity level. Moreover, the device criticality report is user-friendly as it may emphasize accuracy, readability, and providing sufficient information to the user to allow the user to decide whether to permit performance of the online card operation if permission from the user is necessary.

Any of the foregoing variations of the present technique may be implemented by programming a suitable general-purpose computer. The programming may be accomplished through the use of a program storage device readable by the computer and encoding a program of instructions executable by the computer for performing the operations described above.

The flow charts included herein do not necessarily represent an execution in a single hot plugging event, but rather, in some instances, may represent a sequence of coordinated steps, events, or processes occurring in plurality of hot plugging operations. In addition, the flow charts herein should not be interpreted as implying that no other events, steps, or processes can occur between those explicitly represented in the drawings.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A method of determining device criticality in a computer system comprising the steps of:
storing, in a memory of a computer, computer-executable instructions for performing the method;
executing the instructions on the computer;
according to the instructions being executed:
building a component hierarchy graph using computer configuration information;
labeling nodes of the component hierarchy graph with a redundancy attribute;
traversing the component hierarchy graph;
determining whether a device loses an access path, and thereby becomes an identified affected resource, by inspecting redundancy attributes within the component hierarchy graph; and
determining whether to perform an online hot plug operation based on resource analysis information describing any identified affected resource and a corresponding severity level of the identified affected resource, wherein said determining comprises:
if none of said identified affected resources is assigned a medium severity level and if none of said identified affected resources is assigned a high severity level, allowing said online hot plug operation to be performed;
if none of said identified affected resources is assigned said high severity level and if at least one of said identified affected resources is assigned said medium severity level, allowing said online hot plug operation to be performed upon receiving permission from a user; and
if at least one of said identified affected resources is assigned said high severity level, preventing said online hot plug operation from being performed.

2. A method as recited in claim 1 wherein the component hierarchy graph comprises nodes associated with logical constructs within the system.

3. A method as claimed in claim 2 wherein the logical constructs comprise at least one of logical volumes, volume groups, file systems and processes.

4. A method as recited in claim 1 further comprising:
determining whether to perform the online hot plug operation for the device based in part on the criticality of the device.

5. A method as claimed in claim 1 wherein the component hierarchy graph is a directed acyclic graph.

6. The method as recited in claim 1 wherein the device is compatible with one of a Peripheral Component Interface specification and a PCI-X specification.

7. The method as recited in claim 1, wherein nodes of the component hierarchy graph contain redundancy attributes.

8. The method as recited in claim 1 wherein a criticality attribute is associated with nodes of the component hierarchy graph.

9. The method as recited in claim 1 wherein the component hierarchy graph is built at boot time of the computer system.

10. The method as recited in claim 9 wherein the component hierarchy graph is obtained from user space and/or kernel space.

11. The method as recited in claim 1, further comprising:
if said affected resources are nonfunctional before said resource analysis information is obtained, then performing the online hot plug operation without obtaining said resource analysis information.

12. The method as claimed in claim 1, further comprising, if usage of devices that have lost all of their access paths impacts user level processes, then reporting an application level criticality and/or loss of access to data for user applications.

13. A computer system, comprising:
a directed acyclic graph data structure representing a component hierarchy, comprising nodes labeled with a redundancy attribute; and
a control arrangement for traversing the component hierarchy to determining device criticality;
wherein the control arrangement determines whether a device within the computer system loses an access path, and thereby becomes an identified affected resource, by inspecting redundancy attributes within the component hierarchy graph; and
wherein the control arrangement determines whether to perform an online hot plug operation based on the inspected redundancy attributes and resource analysis information describing any identified affected resource and a corresponding severity level of the identified affected resource, wherein said determining comprises:
allowing the online hot plug operation if no identified affected resource is assigned medium or high severity level;
allowing the online hot plug operation if an identified affected resources is assigned medium severity level, if none are assigned high severity level, and if permission is received from a user; and
preventing the online hot plug operation if an identified affected resource is labeled high severity level.

14. The computer system as claimed in claim 13, wherein the component hierarchy graph data structure comprises nodes associated with logical constructs within the system.

15. The computer system as claimed in claim 13 wherein the nodes in the component hierarchy contain redundancy attributes.

16. The computer system as claimed in claim 13 wherein a criticality attribute is associated with nodes of the component hierarchy graph.

17. A computer-implemented method for determining device criticality in a computer system in case of a hot plugging operation, said method comprising:
storing, in a memory of a computer, computer-executable instructions for performing the method;
executing the instructions on the computer;
according to the instructions being executed:
building a component hierarchy graph using computer configuration information;
leveling nodes of the component hierarchy graph with a redundancy attribute;
traversing the component hierarchy graph;
determining whether a device loses an access path by inspecting the redundancy attributes within the component hierarchy graph; and
determining whether to perform the hot plugging operation based on resource analysis information describing any identified affected resource and corresponding severity level, wherein said determining comprises:
allowing the hot plugging operation if no identified affected resource is assigned medium or high severity level;
allowing the hot plugging operation if an identified affected resources is assigned medium severity level, if none are assigned high severity level, and if permission is received from a user; and
preventing the hot plugging operation if an identified affected resource is labeled high severity level.

* * * * *